Patented Jan. 24, 1939

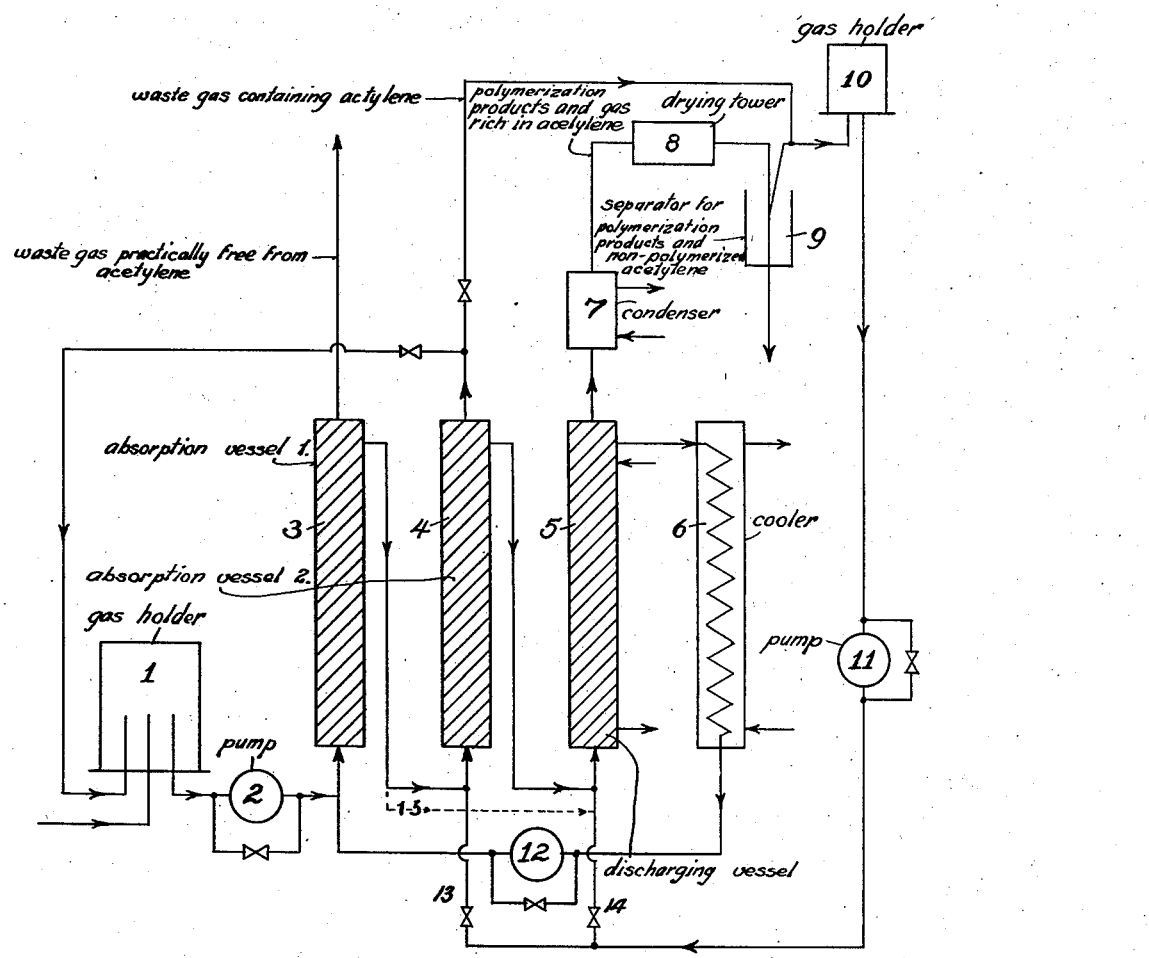

2,145,058

UNITED STATES PATENT OFFICE 2,145,058

CONTINUOUS PRODUCTION OF POLYMERIZATION PRODUCTS OF ACETYLENE

Robert Stadler, Heidelberg, and Karl Haberl, Ludwigshafen-on-the-Rhine, Germany, assignors to I. G. Farbenindustrie Aktiengesellschaft, Frankfort-on-the-Main, Germany Application June 19, 1937, Serial No. 149,138
In Germany June 23, 1936

4 Claims. (Cl. 260—678)

The present invention relates to an improved process for the continuous production of polymerization products of acetylene.

In a copending application Ser. No. 33,072 filed July 25, 1935 one of the present inventors and another have described an improved process for the continuous preparation of polymerization products of acetylene by means of a catalytically acting acid cuprous salt solution in which process acetylene or a gas containing acetylene (such as the gases obtainable by the thermal decomposition of hydrocarbons, such as methane, for example by treating them in the electric arc) is led into the said cuprous salt at such a low temperature that the gas escaping from the said solution is practically free from polymerization products of acetylene and when working with gases poor in acetylene free from acetylene itself, while the cuprous salt solution is continuously withdrawn from the absorption plant and introduced into a regenerating plant, the reaction period being so limited that the principal polymerization product is mono-vinylacetylene. From the gas mixture escaping from the regenerating plant the polymerization products obtained are separated while the residual gas containing acetylene in a concentrated form may be added to the fresh gas introduced into the process or used for other purposes. The regenerated cuprous salt solution is returned into circulation. The regenerating of the said cuprous salt solution may preferably be performed by increasing the temperature of the solution, by blowing in gases into the said solution or by reducing the pressure in the regenerating plant. According to one embodiment of the said continuous process the acetylene gas is introduced into the regenerated acid cuprous salt solution while this solution is kept warm, whereupon it is cooled down to such a low temperature that the gases escaping from the solution are practically free from polymerization products of acetylene, the solution being then returned to the regenerating plant.

The catalytically acting acid cuprous salt solution employed in the said process may contain an ammonium salt or a salt of a tertiary amine but there may be employed instead of nitrogen bases and their salts also the salts of an alkali metal, alkaline earth metal or of a metal of the third group of the periodic system, including the rare earth metals, the halides of these metals being especially suitable. From the cuprous salts cuprous chloride is preferably employed. The temperature of the acid cuprous salt solution in the absorption plant depends on the speed of the acetylene or acetylene gas employed. Generally speaking temperatures up to about 40° C. are suitable.

When working up in the manner described in the said application Ser. No. 33,072 gases poor in acetylene, such as the gases resulting from the thermal treatment of hydrocarbons of the kind of methane, as for example by treating them in the electric arc, which gases contain up to about 20 per cent of acetylene the remainder consisting chiefly of hydrogen, the amount of acetylene absorbed by the catalytically acting acid cuprous salt solution is comparatively small on account of the low acetylene content of the fresh gas.

We have now found that also the continuous production of polymerization products of acetylene from the said gases poor in acetylene is greatly improved as regards the economy of the process when concentrated acetylene is led through the catalytically acting acid cuprous salt solution after this solution has been treated with the gas poor in acetylene. In this way it is possible to increase the yield of acetylene polymers so that the utilization of the heat during the regeneration of the absorption solution on the one hand and of the cooling during the subsequent separation of the polymerization products on the other hand is improved.

The concentrated acetylene may be supplied to the said cuprous salt solution already laden with the acetylene from the gas poor in acetylene either in a further special absorption column or before the entry of the absorption solution into the regeneration plant or at both places. The concentrated acetylene used may be the pure gas, as for example acetylene obtained from carbides, but it is especially advantageous to use the residual gas rich in acetylene escaping during the regeneration of the cuprous salt solution in the process according to the said copending application Ser. No. 33,072.

As already stated above this residual gas enriched in acetylene may—in the process according to the said copending application—be returned into circulation by mixing it with fresh gas. By returning, however, in this way the whole of the enriched acetylene to a fresh gas poor in acetylene the concentration of the acetylene in the fresh gas may be increased to such an extent that when the gas is led through the acid cuprous salt solution at such a low temperature that the gas escaping from this solution is practically free from polymerization products of acetylene, the acetylene is no longer completely absorbed by the solution and thus partly lost with the waste gas.

If according to the present invention, however, the residual gas enriched in acetylene and remaining in the regeneration of the cuprous salt solution after the separation of the polymerization products be not returned to the fresh gas but introduced into the absorption liquid after it has been laden with acetylene from the fresh gas poor in acetylene, a dilution of the residual gas enriched in acetylene by the fresh gas is avoided and a better utilization of the acetylene and an increased economy of the process ensured. The residual gas rich in acetylene may be led through the absorption vessel employed in this stage of the process in the same direction as the cuprous salt solution. It is thus possible to circulate the absorption solution with the aid of the gas current itself according to the principle of the mammoth pump (see "Hütte, Des Ingenieurs Taschenbuch" 25th edition, 1926, Volume II, page 864) while dispensing with special circulatory pumps. Since such pumps are attacked by the acid cuprous salt solutions, the said principle is especially advantageous in this case. Depending on the acetylene content which the residual gas rich in acetylene still has after passage through the absorption solution, it may now be wholly or partly mixed with the fresh gas or returned to the enriched acetylene escaping from the regeneration plant.

The process according to our present invention will be further described with reference to the accompanying drawing for the working up of a residual gas rich in acetylene obtained by the regeneration of a cuprous salt solution laden with acetylene, but the invention is not restricted to the particular arrangement shown diagrammatically in the drawing.

Referring to the drawing, a gas obtained from methane in the electric arc and containing about 18 per cent of acetylene is conveyed from a gas holder 1 by means of a pump 2 into the bottom of an absorption column 3 kept at low temperature, through which there is led in the same direction as the gas an acid cuprous chloride solution containing an ammonium salt or an alkali metal salt or a salt of the alkaline earths, the temperature in the column being kept so low that a gas practically free from acetylene and polymerization products of acetylene leaves the column 3. The absorption solution thus laden with acetylene but, corresponding to the low partial pressure of the acetylene in the gas to be worked up, by no means saturated therewith, is supplied without increase in temperature to the bottom of a second absorption column 4 into and through which there is led in the same direction by means of a pump 11 the residual gas enriched in acetylene from the gas holder 10. A further amount of acetylene is thus absorbed by the cuprous chloride solution in the column 4. The gas now of the lower acetylene content leaving the column 4 is free from polymerization products of acetylene by reason of the low temperature of the column 4. It may be led in part to the gas holder 1 and in part be returned to circulation through the gas holder 10.

The acid cuprous salt solution flowing out from the column 4 is now heated to such a temperature in the column 5 that the polymerization products of acetylene together with the unchanged acetylene escape. The water vapour which escapes at the time is condensed in the condenser 7 and returned to the column 5; the gas is further dried in the drying tower 8, whereupon the polymerization products are condensed and separated by cooling in the separator 9. The non-polymerized acetylene passes as a concentrated gas to the gas holder 10. The regenerated cuprous salt solution is continuously conveyed through the cooler 6 and back into the column 3 by means of a pump 12.

The enriched acetylene collected in the gas holder 10 is led in part into the column 5 by means of the pump 11 in order to facilitate the degasification of the cuprous salt solution on the one hand and to polymerize simultaneously part of the acetylene contained in this enriched gas on the other hand, and in part, as above described, to the absorption column 4 in which column a large part of the acetylene contained in this gas is absorbed by reason of its high acetylene partial pressure.

Numerous modifications of the described method of working are possible. For example the acetylene may be led in counter-current in the column 3 instead of in the same direction as the cuprous salt solution. The latter may also be circulated by the gas current itself according to the principle of the mammoth pump (cf. above) instead of by the aid of pumps. The residual gas enriched in acetylene may also be led in circulation only through the column 5, then supplied to the column 4 and from this—after absorption of the greater part of the acetylene—to the fresh gas in the gas holder 1.

If desired the absorption in the columns 3 and/or 4 may be increased by increasing the pressure.

The following example will further illustrate how our present invention can be carried out in practice but the invention is not restricted to this example.

*Example*

In this example a concentrated residual gas is led from the gas holder 10 only into the column 4, but not also into the regeneration column 5.

250 litres of a fresh gas obtained by treating methane in the electric arc and containing besides hydrogen 18 percent of acetylene and simultaneously 9 litres of waste gas from the column 4 containing about 30 per cent of acetylene are supplied per hour to the gas holder 1. The content of acetylene in the mixed gas thus obtained is therefore about 18.5 per cent. This gas is treated at 30° C. with an acid cuprous chloride solution containing about 21 per cent by weight of common salt in the column 3, the gas and solution flowing in the same direction from the bottom to the top of the column. The waste gas escaping from the column 3 contains only about 1 per cent of acetylene. The absorption solution passes from the top of the column 3 to the bottom of the column 4 and is treated therein at 30° C. with the gas containing about 40 per cent of acetylene taken from the gas holder 10 while flowing in the same direction as the gas. Apart from the 9 litres of waste gas which as stated above are mixed per hour with the fresh gas, the gas leaving the column 4 and containing about 30 per cent of acetylene is led back into the gas holder 10. The cuprous chloride solution withdrawn from the column 4 is introduced into the column 5 and heated therein to 85° C., a gas being set free which contains, in addition to water vapour, 14 per cent of vinyl acetylene and polymerization products of acetylene of higher boiling point, 73 per cent of acetylene and 13 per cent of other gases. The water vapour is condensed by external cooling with water in the condenser 7 and returns to the column 5, the small remainder of the water vapour escaping with the gases from the condenser 7 being bound in the drying tower 8.

The polymerization products are collected in the separator 9 in which 65 cubic centimeters of condensate are obtained per hour. The gas escaping from the separator contains 85 per cent of acetylene and is also supplied to the gas holder 10. The regenerated cuprous chloride solution is cooled down to 30° C. in the cooler 6 and circulated to the absorption column 3 by means of a pump 12.

The condensate recovered in the separator 9 consists to the extent of 85 per cent of monovinylacetylene. Thus, of the acetylene introduced per hour 94 per cent is obtained in the form of polymerization products of acetylene and 80 per cent in the form of pure monovinylacetylene.

Instead of introducing the residual gas from the gas holder 10 only into the column 4 as described in detail in the preceding example it may be introduced into both the columns 4 and 5 through the pipes 13 and 14. Furthermore, the cuprous chloride solution may be led from column 3 directly to the regenerating column 5 through the pipe 15 indicated by — —> — —> in the annexed drawing and treated therein with an appropriate amount of the residual gas from the gas holder 10. Instead of the said residual gas other gases rich in acetylene or pure concentrated acetylene may be employed.

What we claim is:

1. A process for the continuous preparation of polymerization products of acetylene by means of a catalytically acting acid cuprous salt solution from gases poor in acetylene which comprises continuously leading in a first absorption vessel a gas poor in acetylene through the catalytically acting solution at such a low temperature that the gas escaping from said solution is practically free from polymerization products of acetylene and from acetylene itself, continuously withdrawing from the first absorption vessel the cuprous salt solution containing therein the absorbed acetylene, introducing it into a second absorption vessel and continuously leading therein through the said solution a gas rich in acetylene and continuously discharging from this solution the reaction products and absorbed acetylene at such a temperature that the main reaction product is monovinyl acetylene, and continuously returning the regenerated catalyst solution to the first absorption vessel.

2. In the process according to claim 1 the step which comprises discharging the reaction products and the absorbed acetylene from the vessel into which the gas rich in acetylene is introduced.

3. In the process according to claim 1 the step which comprises discharging the reaction products and the absorbed acetylene after withdrawing the cuprous salt solution from the second absorption vessel in a special discharging vessel.

4. In the process according to claim 1 the step which comprises using as the gas rich in acetylene the acetylene discharged from the cuprous salt solution used as an absorbing liquid.

ROBERT STADLER.
KARL HABERL.